United States Patent
Brown et al.

(10) Patent No.: US 10,764,791 B2
(45) Date of Patent: Sep. 1, 2020

(54) VOICE SERVICE CLIENT DEVICE

(71) Applicant: British Telecommunications Public Limited Company, London (GB)

(72) Inventors: Ruth Brown, London (GB); Alistair Gomez, London (GB); Maria Cuevas Ramirez, London (GB)

(73) Assignee: British Telecommunications Public Limited Copmany, London (GB)

( * ) Notice: Subject to any disclaimer, the term of this patent is extended or adjusted under 35 U.S.C. 154(b) by 0 days.

(21) Appl. No.: 16/086,351

(22) PCT Filed: Mar. 27, 2017

(86) PCT No.: PCT/EP2017/057204
§ 371 (c)(1),
(2) Date: Sep. 19, 2018

(87) PCT Pub. No.: WO2017/167694
PCT Pub. Date: Oct. 5, 2017

(65) Prior Publication Data
US 2019/0124559 A1    Apr. 25, 2019

(30) Foreign Application Priority Data
Mar. 31, 2016  (EP) ..................................... 16163170

(51) Int. Cl.
*H04W 36/00* (2009.01)
*H04W 36/30* (2009.01)
(Continued)

(52) U.S. Cl.
CPC ... *H04W 36/0022* (2013.01); *H04W 36/0085* (2018.08); *H04W 36/165* (2013.01);
(Continued)

(58) Field of Classification Search
None
See application file for complete search history.

(56) References Cited

U.S. PATENT DOCUMENTS 8,805,374 B2   8/2014 Zhu
9,420,510 B1   8/2016 Surmay et al.
(Continued)

FOREIGN PATENT DOCUMENTS

CN    105554855       5/2016
EP    2 900 016 A1    7/2015
(Continued)

OTHER PUBLICATIONS

U.S. Appl. No. 16/065,906, filed Jun. 25, 2018, Inventor(s): Brown et al.
(Continued)

*Primary Examiner* — Mohammad S Adhami
(74) *Attorney, Agent, or Firm* — Patterson Thuente Pedersen, P.A.

(57) ABSTRACT

A mobile device capable of connecting to a voice service using Voice over LTE (VoLTE) via a cellular network and Voice over Wi-Fi (VoWiFi) via a wireless local area network is connected to VoWiFi and arranged to receive notifications from a wireless access point when the voice service via VoWiFi is disrupted and to disconnect from VoWiFi and connect to VoLTE to maintain the voice service. The mobile device is operable to test the connection to the cellular network and if the cellular network connection is insufficient to support VoLTE, the mobile device ignored the notification and remains connected to VoWiFi.

13 Claims, 6 Drawing Sheets

(51) Int. Cl.
*H04W 76/19* (2018.01)
*H04W 76/30* (2018.01)
*H04W 36/16* (2009.01)
*H04W 48/06* (2009.01)
*H04W 48/16* (2009.01)
*H04W 84/12* (2009.01)
*H04W 92/02* (2009.01)

(52) U.S. Cl.
CPC ........... *H04W 36/30* (2013.01); *H04W 48/06* (2013.01); *H04W 48/16* (2013.01); *H04W 76/19* (2018.02); *H04W 76/30* (2018.02); *H04W 84/12* (2013.01); *H04W 92/02* (2013.01)

(56) References Cited

U.S. PATENT DOCUMENTS

| | | | |
|---|---|---|---|
| 9,883,436 | B2 | 1/2018 | Brown et al. |
| 10,123,241 | B2 | 11/2018 | Brown et al. |
| 10,142,919 | B2 | 11/2018 | Brown et al. |
| 10,231,177 | B2 | 3/2019 | Ringland et al. |
| 10,356,706 | B2 | 7/2019 | Ringland et al. |
| 2005/0059400 | A1* | 3/2005 | Jagadeesan ............ H04W 36/30 455/436 |
| 2005/0271021 | A1 | 12/2005 | Alemany et al. |
| 2006/0240828 | A1 | 10/2006 | Jain |
| 2009/0046655 | A1 | 2/2009 | Zhao et al. |
| 2010/0003921 | A1* | 1/2010 | Godlewski ............ H04W 76/32 455/67.11 |
| 2011/0002466 | A1 | 1/2011 | Kwak et al. |
| 2012/0170548 | A1 | 7/2012 | Rajagopalan |
| 2012/0269182 | A1 | 10/2012 | Walker |
| 2012/0315905 | A1 | 12/2012 | Zhu et al. |
| 2012/0324100 | A1 | 12/2012 | Tomici et al. |
| 2013/0121145 | A1 | 5/2013 | Draznin et al. |
| 2014/0313888 | A1 | 10/2014 | Linkola |
| 2015/0117209 | A1 | 4/2015 | Lee |
| 2015/0189556 | A1* | 7/2015 | Sidhu .................... H04W 36/14 455/436 |
| 2015/0201363 | A1 | 7/2015 | Lundqvist et al. |
| 2015/0215832 | A1* | 7/2015 | Fitzpatrick ............ H04W 48/18 455/426.1 |
| 2015/0282013 | A1* | 10/2015 | Kim ...................... H04W 24/10 370/331 |
| 2016/0073286 | A1 | 3/2016 | Wang |
| 2016/0095050 | A1 | 3/2016 | Lindheimer |
| 2016/0157239 | A1* | 6/2016 | Kalderen ................ H04L 47/11 370/329 |
| 2016/0174110 | A1 | 6/2016 | Sharma et al. |
| 2016/0316425 | A1 | 10/2016 | Cili et al. |
| 2016/0345256 | A1 | 11/2016 | Niranjan |
| 2016/0373989 | A1 | 12/2016 | Tinnakornsrisuphap et al. |
| 2017/0034729 | A1 | 2/2017 | Persson et al. |
| 2017/0134261 | A1 | 5/2017 | Seo |
| 2017/0374597 | A1 | 12/2017 | Ray |
| 2018/0124630 | A1 | 5/2018 | Ringland et al. |
| 2018/0254979 | A1 | 9/2018 | Scahill et al. |
| 2019/0069328 | A1* | 2/2019 | Sharma .................. H04L 43/16 |

FOREIGN PATENT DOCUMENTS

| | | | |
|---|---|---|---|
| EP | 2 925 056 | A2 | 9/2015 |
| WO | WO 2004/102919 | A1 | 11/2004 |
| WO | WO 2007/076147 | A2 | 7/2007 |
| WO | WO 2015/150745 | A1 | 10/2015 |
| WO | WO 2006/138019 | | 12/2016 |
| WO | WO 2017/114932 | A1 | 7/2017 |
| WO | WO 2017/167694 | A1 | 10/2017 |
| WO | WO 2017/167701 | A1 | 10/2017 |
| WO | WO 2018/002130 | A1 | 1/2018 |
| WO | WO2018/178241 | | 10/2018 |
| WO | WO2018/178293 | | 10/2018 |
| WO | WO2018/178294 | | 10/2018 |
| WO | WO 2018/234037 | | 12/2018 |
| WO | WO 2018/234038 | | 12/2018 |

OTHER PUBLICATIONS

Application as filed for U.S. Appl. No. 16/087,827, filed Sep. 24, 2018, Inventor(s): Faus Gregori.
International Preliminary Report on Patentability for corresponding International Application No. PCT/EP2017/057204 dated Oct. 2, 2018; 6 pages.
International Search Report and Written Opinion for corresponding International Application No. PCT/EP2017/057204 dated Apr. 21, 2017; 9 pages.
International Search Report and Written Opinion for PCT Application No. PCT/EP2017/057225dated May 8, 2017; 13 pages.
Kaufman et al.; "RFC 7296—Internet Key Exchange Protocol Version 2 (KIEv2)", Oct. 1, 2014, XP055243756, retrieved from the internet: http://tools.ietf.org/html/rfc7296#p. 58.
Application as filed for U.S. Appl. No. 16/311,826, filed Dec. 20, 2018, Inventor(s): Brown et al.
Combined Search and Examination Report, Application No. GB1705248.1, dated Aug. 25, 2017, 6 pages.
International Search Report and Written Opinion, Application No. PCT/EP2018/058085, dated May 17, 2018, 19 pages.
PCT International Search Report and Written Opinion for International Application No. PCT/EP2018/058202, dated May 2, 2018, 4 pages.
Combined Search and Examination Report for GB application no. 1705262.2, dated Oct. 12, 2017, 4 pages.
PCT International Search Report and Written Opinion for International Application No. PCT/EP2018/058199, dated May 17, 2018, 8 pages.
EP Search Report for 17164395.0-1854, dated Sep. 22, 2017, 17 pages.
Combined Search and Examination Report for GB application No. 1705257.2, dated Aug. 17, 2017, 2 pages.
3rd Generation Partnership Project; Technical Specification Group Radio Access Network; Study on WLAN/3GPP Radio Interworking (Release 12), May 15, 2014 (May 14, 2014), XP050816244, Retrieved from the Internet https://www.3gpp.org/ftp/tsg_ran/WG2_RL2/TSGR2_83bis/Docs/.
Huawei: "How solutions 1, 2 and 3 work without ANDSF", vol. Ran WG2, No. Ljubljana, Slovenia; Oct. 7, 2013-Oct. 11, 2013, Sep. 27, 2013 (Sep. 27, 2013), XP050719049, Retrieved from the Internet https://portal.3gpp.org/desktopmodules/Specifications/SpecificationDetails.aspx ?specificationId=2623.
Alcatel-Lucent, "Policy based terminal triggered, ANDSF decided access selection", 3GPP Draft; S2-081355 ANDSF Discussion, $3^{RD}$ Generation Partnership Project (3GPP), Mobile Competence Centre; 650, Route Des Lucioles; F-06921 Sophia-Antipolis Cedex; France, vol. SA WG2, No. Athens; Feb. 8, 2008, Feb. 8, 2008.
Alcatel-Lucent: "Policy based terminal triggered, ANDSF decided access selection", 3GPP Draft; S2-081658_Revision of 1355_ANDSF Discussion V2, 3RD Generation Partnership Project (3GPP), Mobile Competence Centre; 650, Route Des Lucioles; F-06921 Sophia-Antipolis Cedex; France, vol. SA WG2, No. Athens; Feb. 16, 2008, Feb. 16, 2008 (Feb. 16, 2008), XP050263998, 6 pages. 2.
Application as filed for U.S. Appl. No. 16/065,906, filed Jun. 25, 2018, Inventor(s): Brown et al.
International Preliminary Report on Patentability for corresponding International Application No. PCT/EP2016/082894 dated Jul. 3, 2018; 9 pages.
International Search Report and Written Opinion for corresponding International Application No. PCT/EP2016/082894 dated Feb. 17, 2017; 12 pages.
3GPP TS 23.402 V13.4.0 (Dec. 2015) $3^{rd}$ Generation Partnership Project; Technical Specification Group Services and System Aspects; Architecture enhancements for non-3GPP accesses (Release 13); 650 Route des Lucioles Sophia Antipolis Valbonne; 298 pages.

(56) References Cited

OTHER PUBLICATIONS

Ericsson; "W-Fi calling—extending the reach of VoLTE to Wi-Fi Wi-Fi calling—extending the reach of VoLTE to Wi-Fi", Jan. 30, 2015, XP055251865; 5 pages [retrieved Dec. 26, 2018].
International Preliminary Report on Patentability for PCT Application No. PCT/EP2017/057204 dated Oct. 2, 2018; 6 pages.
International Search Report and Written Opinion for PCT Application No. PCT/EP2017/057204 dated Apr. 21, 2017; 9 pages.
International Preliminary Report on Patentability for PCT Application No. PCT/EP2017/057225 dated Jul. 3, 2018; 10 pages.
International Search Report and Written Opinion for PCT Application No. PCT/EP2017/057225 dated May 18, 2017; 13 pages.
Kaufman et al.; "RFC 7296—Internet Key Exchange Protocol Version 2 (KIEv2)", Oct. 1, 2014, XP055243756, retrieved from the internet: http://tools.ietf.org/html/rfc7296#page-58.
International Search Report and Written Opinion for PCT Application No. PCT/EP2017/065977 dated Sep. 6, 2017; 10 pages.

* cited by examiner

VOICE SERVICE CLIENT DEVICE

CROSS-REFERENCE TO RELATED APPLICATION

The present application is a National Phase entry of PCT Application No. PCT/EP2017/057204, filed Mar. 27, 2017, which claims priority from EP Patent Application No. 16163170.0, filed Mar. 31, 2016 each of which is hereby fully incorporated herein by reference.

TECHNICAL FIELD

The present disclosure relates to wireless communication devices and in particular to a method and apparatus for operating a wireless device connectable to both WLAN and cellular services.

BACKGROUND

Cellular data networks provide data connectivity to mobile devices having cellular network interfaces. The network is formed of a network core for handling control plane functions and data packet routing, and a radio access network (RAN) of macrocell base stations located throughout the coverage area of the mobile network for wireless communication with subscriber mobile devices. An example of a cellular network architecture is Long Term Evolution (LTE). Unlike previous generation second generation (2G) and third generation (3G) cellular networks which offer packet switched data services on top of a circuit switched voice platform, LTE is an all-packet switched data network architecture that does not support the traditional voice calling platform.

Wireless local area networks (WLANs) operating in accordance with the IEEE 802.11 family of standards (commonly referred to as Wi-Fi) are common in many user locations and provide data connectivity over a short geographic range. Typically the wireless local area network is generated and maintained by a wireless access point which acts as a packet routing interface between devices connected to the WLAN (e.g. smartphones, tablets) and local devices connected via a wired interface (televisions, network attached storage). The wireless access point serves local devices and will typically be co-located, or integrated with an external network interface such as a modem for providing a backhaul link to external networks such as the Internet via an Internet Service Provider's core network. Example backhaul technologies include Digital Subscriber Line (xDSL) copper/fiber and cable based on the Data over Cable Service Interface Specifications (DOCSIS) architecture.

Such a combined WLAN, routing and modem device will be referred to as a hub throughout the description.

Both LTE and WLANs are examples of packet switched data networks in which application data is split into packets and the packets can take any path within the network to arrive at the receiver. In contrast the circuit switched networks require a dedicated data path to be established prior to sending data along the dedicated circuit.

VoIP/VoLTE/VoWiFi

Voice over Internet Protocol (VoIP) applications are known for allowing voice communication via a packet switched network. The voice data is sampled into packets of voice data and the packets are sent over the data network.

VoIP applications are Over-The Top (OTT) services which typically require a user to generate a username identity and generally a VoIP call can only be established between two users having the same VoIP application on their mobile devices. Even where the VoIP application allows calls to conventional telephones and the caller information display shows the caller's telephone number, when the callee tries to return the call, the call is forwarded to the user's mobile, hence the call is received via the standard dialer and not the VoIP application.

Furthermore, in the VoIP service it is not possible to maintain a call if the mobile device moves out of range of the current access point and requires a handover from one access technology to another.

Voice over LTE (VoLTE) is a voice service running over LTE which uses optimized headers and priority marking to provide a voice service using the packet switched network with an aim to reducing/replacing the reliance on Circuit Switched Fall Back (CSFB) and VoIP services. This will reduce operating overheads and may allow parts of the legacy 2G and 3G platforms to be switched off.

Due to the prevalence of WLANs in many areas, the Voice over Wi-Fi (VoWiFi) or Wi-Fi Calling service has also been deployed by several network operators. In VoWiFi, the WLAN is regarded as a non-$3^{rd}$ Generation Partnership Project (non-3GPP) access network base station to the LTE network so that voice calls are made and received using the standard telephony software and packet data is tunneled to and from the cellular network core. VoWiFi therefore appear to extend the cellular network coverage to indoor locations where the cellular reception may be reduced. When the mobile device leaves the range of the WLAN and VoLTE is available, then at present the mobile device will register to a normal VoLTE service. It is expected that future implementations of VoWiFi will allow handovers from VoWiFi to VoLTE and VoLTE to VoWiFi.

Mobile devices such as smartphones will therefore have both a cellular network interface and a WLAN interface for data connectivity. Generally, the mobile device is configured to prefer the WLAN interface for all data connectivity when both WLAN and cellular access is available.

The Applicant's co-pending European applications EP15187793.3 and EP15203278.5 provide methods for determining when a link between the hub and the VoWiFi service is disrupted or not available and instructing the mobile device to disconnect from VoWiFi. In this way the mobile device is forced to connect to VoLTE to maintain its connection to a Multimedia Telephony service (MMTel) voice service even if the mobile device's view is that the WLAN signal quality appears to be sufficient to support VoWiFi.

In those co-pending applications, the processing is based on monitoring the link to the VoWiFi service on behalf of the mobile devices so that the presence of a stable WLAN link is not the sole determinant in whether a mobile device should use VoWiFi or VoLTE.

However, the determination to switch away from VoWiFi does not consider any circumstances of the mobile device relative to the LTE link quality.

SUMMARY

The present disclosure addresses the above problem.

In one aspect, an embodiment of the present disclosure provides a method of operating a mobile device having a cellular network interface for connection to a cellular network and a wireless local area network interface for connecting to a wireless local area network, the device being connected to a voice service provided via a voice service gateway accessible via the wireless local area network interface, the method comprising: receiving a notification from a wireless access point connected to the device via the wireless local area network interface to disconnect from the voice service via the wireless local area network interface; determining whether the disconnection notification is generated due to network congestion to the voice service gateway via the wireless local area network interface; if it is determined that the disconnection notification is due to network congestion, determining a signal quality to said cellular network via said cellular network interface; comparing the determined signal quality against a predetermined threshold; and if the signal quality to the cellular network is below a predetermined threshold, maintaining the connection to the voice service via the wireless local area network and voice service gateway.

In another aspect, an embodiment of the present disclosure provides an apparatus having a cellular network interface for connection to a cellular network and a wireless local area network interface for connecting to a wireless local area network, comprising: a voice service accessor for connecting to a voice service provided via a voice service gateway accessible via the wireless local area network interface; a receiver for receiving a notification from a wireless access point connected to the device via the wireless local area network interface to disconnect from the voice service via the wireless local area network interface; means for determining whether the disconnection notification is generated due to network congestion to the voice service gateway via the wireless local area network interface; means for determining a signal quality to said cellular network via said cellular network interface if it is determined that the disconnection notification is due to network congestion; means for comparing the determined signal quality against a predetermined threshold; and wherein the voice service accessor is configured to maintain the connection to the voice service via the wireless local area network and voice service gateway if the signal quality to the cellular network is below a predetermined threshold.

BRIEF DESCRIPTION OF THE DRAWINGS

Embodiments of the present disclosure will now be described with the aid of the accompanying Figures in which.

DESCRIPTION

System Overview

Figure 1:
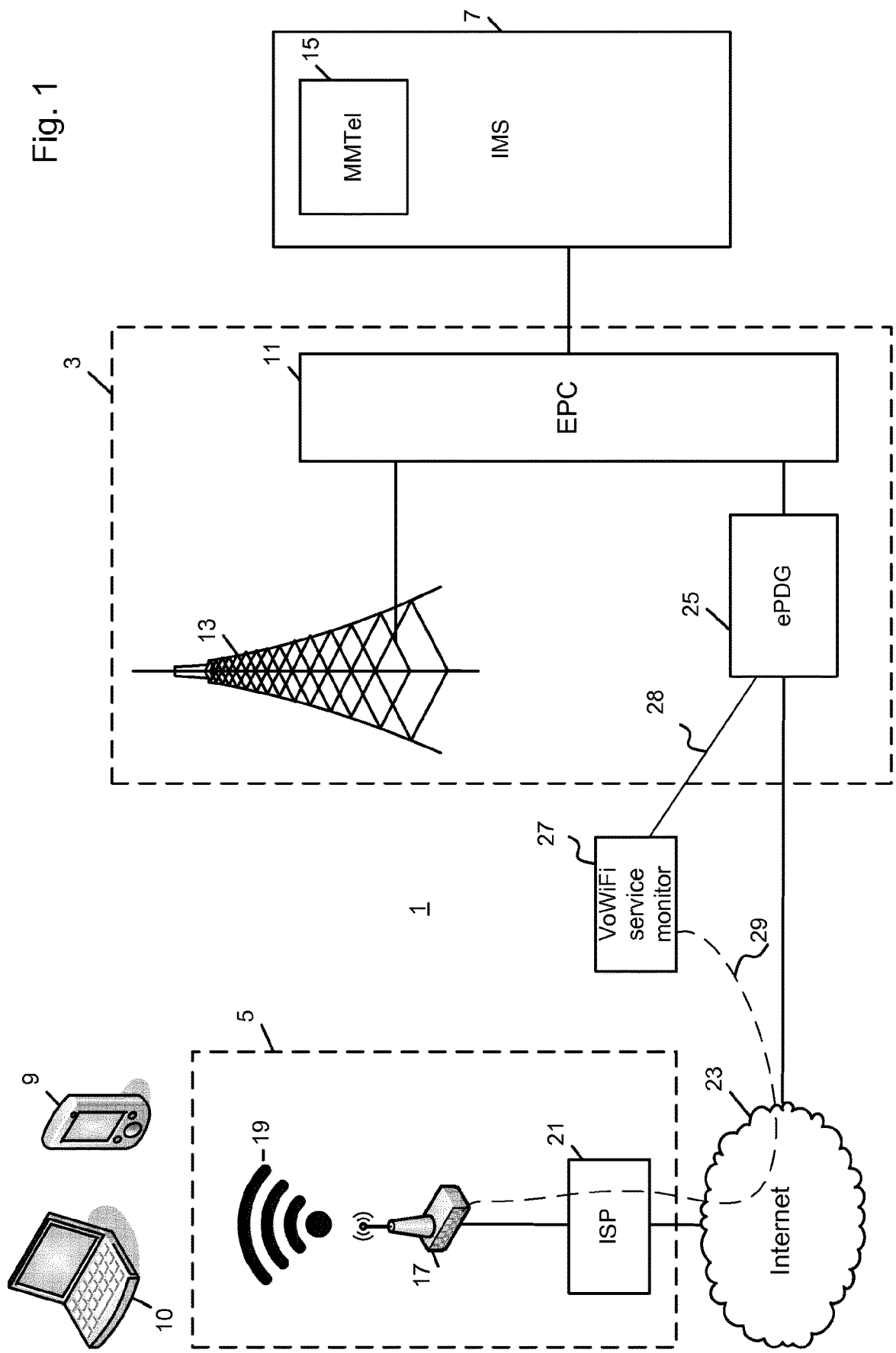
FIG. 1 schematically shows an overview of a telecommunications network of the first embodiment.

FIG. 1 shows an overview of the main components in a telecommunications communication system 1 according to the first embodiment. The system 1 has several functional subsystems: a Long Term Evolution (LTE) cellular network 3 infrastructure; non-cellular network infrastructure 5 including a local network and Internet Service Provider (ISP) architecture; and an IP Multimedia Subsystem (IMS) 7.

The LTE cellular network 3 provides cellular network client devices, known as User Entities (UE) such as mobile telephones 9 with data and voice services using a packet-switched IP network in contrast to the older circuit switched networks. The LTE cellular network includes a network core 11 and a radio access network formed of eNodeBs 13 for connecting services and resources in the network core 11 to the UEs 9. The network core 11 contains the standard control functions such as a Multimedia Mobility Entity (MME) (not shown), a Home Subscriber Server (HSS) (not shown), and a Policy Configuration Rules Function (PCRF) (not shown). For routing data packets to remote resources, there are a number of Serving Gateways (SGW) (not shown) and Packet Gateways (PGW) (not shown).

The IMS 5 is an IP data network which provides a unified service architecture for all networks. Multiple services can be provided on a single control/service layer even though the access networks may be different. The IMS 7 therefore reduces the need for duplication in data services/applications. The VoLTE and VoWiFi voice calling services are hosted in an application server 15 within the IMS 7 which in this embodiment is provided by a service known as the Multimedia Telephony Service (MMTel).

The non-cellular network infrastructure 5 includes a wireless access point/modem router device 17, hereinafter referred to as a hub, located in the home generating a wireless local area network (WLAN) 19 in accordance with the IEEE 802.11 family of standards to allow communication with UEs 9 and also WLAN only devices such as a computer 10. For external network access, the hub 17 communicates with an Internet Service Provider (ISP) 21 which routes data via a wide area network such as the Internet 23 to external servers and users.

Due to the ability of the LTE cellular network 3 to use non-cellular access for applications such as Wi-Fi-Offload, the LTE cellular network 3 also includes an Evolved Packet Data Gateway (ePDG) 25 which acts as a termination point for IPSec tunnels with the UE over non-trusted 3GPP IP systems. This allows data into the EPC network core 11 for processing within the LTE cellular 3 and IMS 5 networks.

The system in FIG. 1 also includes a VoWiFi service monitor 27 which is a network component maintained by the ISP or a third party. As shown in FIG. 1, the VoWiFi service monitor has a data link 28 to the ePDG 25 and also a data link 29 to the hub 17. The VoWiFi service monitors whether the ePDG 25 is accessible, and therefore VoWiFi is available, on behalf of the hub 17 and informs the hubs of any changes in the accessibility of the ePDG 25 over time.

The UE 9 has both WLAN and LTE radio interfaces for accessing the non-cellular network infrastructure and the LTE cellular network respectively and the UE 9 supports VoLTE, VoWiFi and CSFB voice calls. To highlight the difference between UEs 9 and other connected WLAN devices 10, the computer 10 only has a WLAN interface and therefore can only access the WLAN 19 of the hub 17 but not the cellular network 3 since it does not have an interface capable of sending and receiving LTE signals.

Behavior of UE for Activating Wi-Fi and LTE Interfaces

As mentioned above, the UE 9 has both WLAN and LTE interfaces for connecting to both the WLAN and LTE networks. Furthermore it is capable of both VoLTE and VoWiFi call handling. Since an eNodeB 13 of the LTE network has a larger geographical coverage range than a WLAN 19, in general the UE will be connected to the LTE network 3 and will use VoLTE for voice services.

However, when the UE is within range of a WLAN 19 such as shown in FIG. 1, there is overlap in the connectivity ranges, and the UE 9 could connect to data services using either the cellular interface or the WLAN interface. In general, the default policy is that a WLAN connection is preferred. So when a UE is connected to the LTE network and it detects a known WLAN, the UE will try to use the WLAN.

Therefore upon detection of a known WLAN, the UE 9 will enable its WLAN interface and disable the cellular interface causing any existing services to also be disconnected. This change is generally transparent to the user of the UE as it has little impact to the operation of services such as file transfers and web browsing. However, the general UE policy of preferring WLANs to cellular data interfaces can have an impact on the Quality of Experience for users of voice services using VoWiFi instead of VoLTE.

In particular, the VoWiFi service is only available when the UE 9 has a data link to the MMTel service 15 in the IMS 7 via the ePDG 25. If the ePDG 25 is not operational, then the UE cannot access the MMTel service and therefore will not be able to make and receive voice calls using VoWiFi.

In the embodiment, the hub 17 is aware that some connected devices can use VoWiFi and so it uses information from the VoWiFi service monitor 27 regarding the accessibility of the ePDG 25, and therefore the availability of the VoWiFi service, to manage UEs access to VoWiFi.

Figure 2:
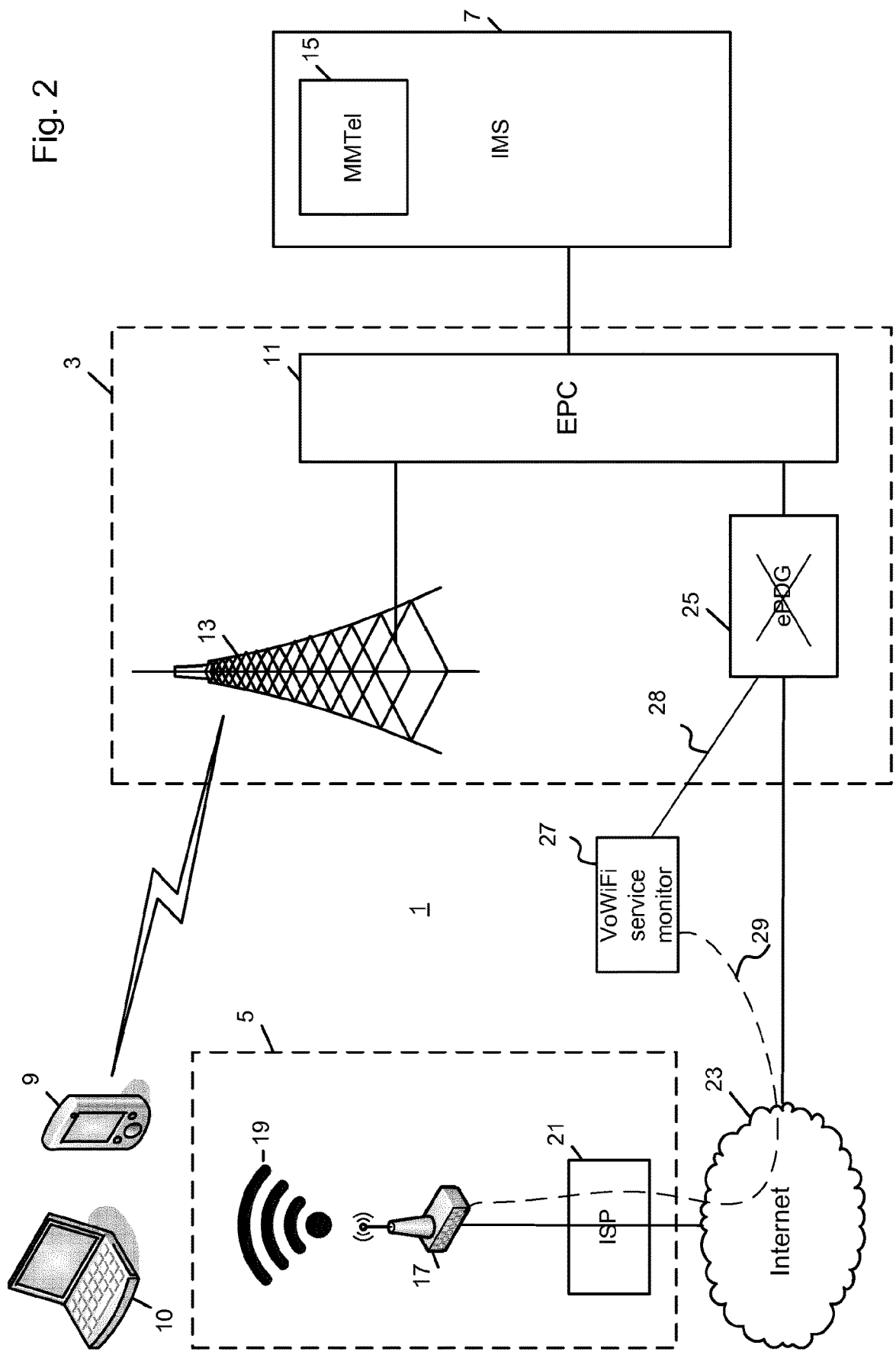
FIG. 2 schematically shows the behavior of a hub and UE in the telecommunications network when a link to a VoWiFi service component is disrupted.

As shown in FIG. 2, if the ePDG 25 loses service, the VoWiFi service monitor 27 will notice the loss of service for example because the logical data link 28 is down, and inform the hub 17 that the ePDG 25 is not available. With the new data, the hub 17 can then notify connected VoWiFi capable UEs 9 using the VoWiFi service that in order to maintain voice connectivity, the UEs 9 should disconnect from VoWiFi and register on VoLTE despite the WLAN 19 being available.

Additionally, if VoWiFi monitor service 27 determines that the data link 28 to the ePDG is operational but below a threshold throughput, perhaps due to congestion or overloading at the ePDG, then it may deduce that it will not be possible to maintain a reliable VoWiFi service. Therefore the hub can also notify connected VoWiFi capable UEs 9 using the VoWiFi service for that MNO that in order to maintain voice connectivity, the UEs 9 should disconnect from VoWiFi and register on VoLTE despite the WLAN 19 being available.

To differentiate between backhaul loss and potential loss of backhaul due to congestion, the VoWiFi monitor service 27 will append different status messages to the disconnection notification.

Since it is only the ePDG 25 or the link to the ePDG 28 which is determined to be inaccessible, the UE 9 may switch to VoLTE and LTE for all data services, or maintain both wireless connections so that LTE is used for VoLTE but all other data services use Wi-Fi.

The VoWiFi service monitor 27 constantly monitors the link to the ePDG and when the ePDG 25 or the connection to the ePDG 25 is restored, the hub 17 is notified so that it can instruct connected UEs 9 that registration on VoWiFi is available.

The components of the hub will now be described with reference to FIG. 3.

Figure 3:
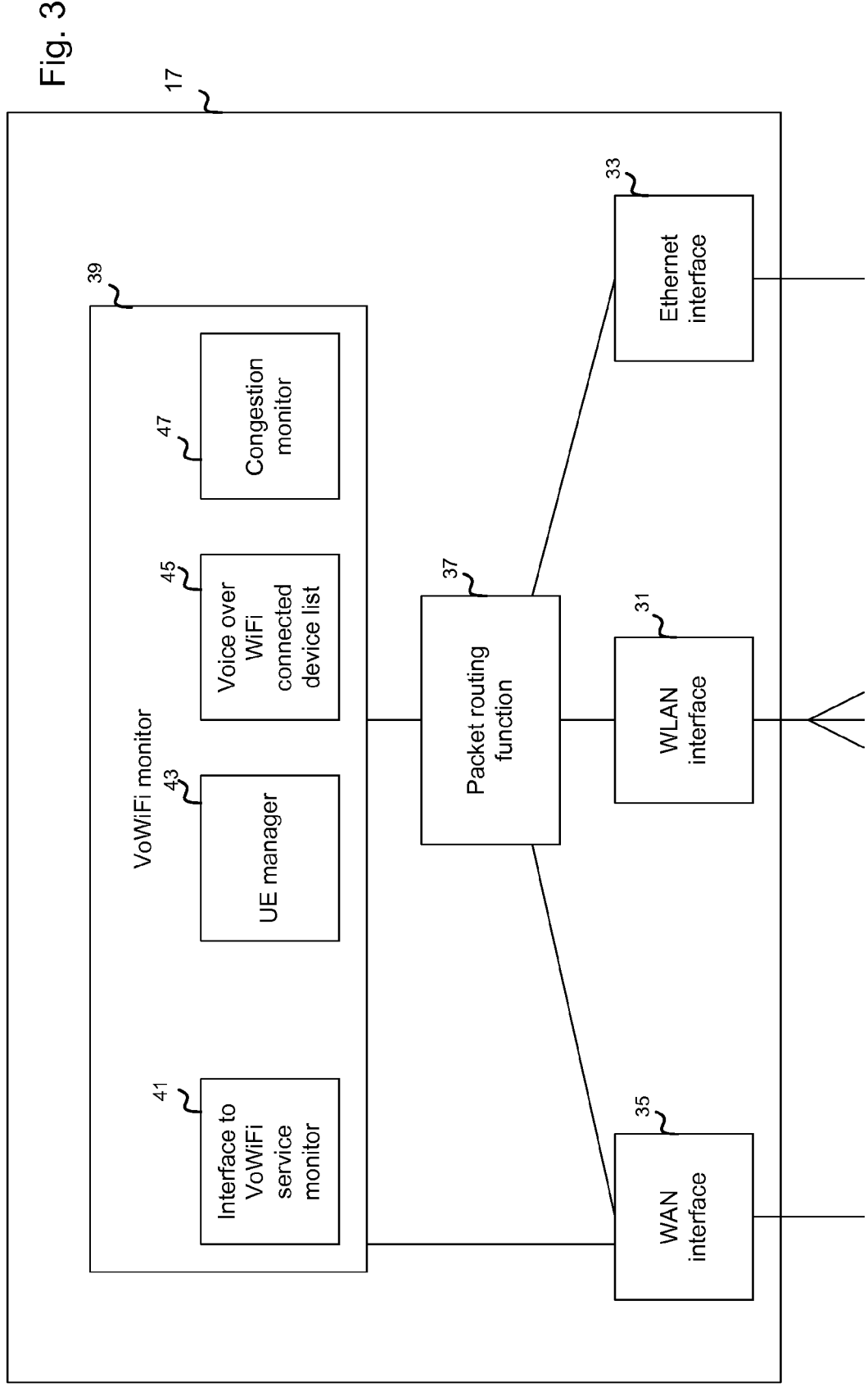
FIG. 3 schematically shows the internal components of a hub in accordance with the first embodiment.

FIG. 3 shows the internal components of the hub 17 in more detail. The hub 17 contains a number of network interfaces for communication with various types of network device. For local devices, there is a Wireless Local Area Network (WLAN) interface 31 for communication with wireless devices using a wireless protocol such as the IEEE 802.11 family of wireless LAN standards known as Wi-Fi. In this embodiment, the WLAN interface 31 is compliant with the 802.11ac standard for WLAN operation. For wired LAN devices there is an Ethernet interface 33 in accordance with the IEEE 802.3 standards.

For connectivity to the Internet Service Provider (ISP), the hub 17 has a Wide Area Network (WAN) interface 35 which in this embodiment is a modem compliant with the Digital Subscriber Line (xDSL) family of standards such as Very High Speed DSL (VDSL) modem. In an alternative where the ISP is based on Data Over Cable Service Interface Specification (DOCSIS), the WAN interface 35 is a cable modem compliant with the DOCSIS cable standards.

The hub 17 also contains a packet routing function 37 which is responsible for managing the flow of data packets between the three interfaces 31, 33, 35. The packet routing function 37 processes the headers of incoming packets received on the three interfaces 31, 33, 35 and determines where to send the packets for onward delivery to the intended packet destination. The packet routing function 37 will also include functions such as Network Address Translation (NAT) for directing packets between the local interfaces 31, 33 and the WAN interface 35.

To process the information from the VoWiFi service monitor 27 and apply the information to connected UEs 9, the hub 17 contains a VoWiFi monitor function 39. This function is connected to the WAN interface 35 and the packet routing function 37 and is responsible for communication with the VoWiFi service monitor 27 to determine when UEs 9 would not be able to use VoWiFi and if required to notify the UEs 9 to switch to VoLTE.

The VoWiFi monitor function 39 contains an interface to the VoWiFi service monitor 41, a UE manager 43, a VoWiFi connected client list 45 and a congestion monitor 47.

The interface to the VoWiFi service monitor 41 is linked to the VoWiFi service monitor 27 via data link 29 to receive status information about the ePDG 25 of the MNO 3. The connected device list 45 contains the identity of any UEs 9 which are using the VoWiFi service. The connected device list 45 is a subset of the total population of devices connected to the WLAN. Whilst any WLAN capable device 9, 10 can connect to the hub 17 provided it has the relevant credentials, not every device will be VoWiFi capable. For example, certain smart phones have both VoLTE and VoWiFi capability, but older smartphones, laptops and computers will not be capable of supporting VoWiFi and therefore will not benefit from the processing of the first embodiment. Furthermore, some smartphones may have the relevant hardware, but the service has not been enabled by their MNO. It is therefore important for the hub 17 to identify a set of VoWiFi capable UEs from the total population of connected UEs on the WLAN to reduce its processing load.

In this embodiment, the hub 17 makes a passive determination of whether the device is operating a VoWiFi service by analyzing the address information of data packets sent between UEs and external resources.

The VoWiFi monitor 39 retrieves a list of known ePDG addresses from an ePDG directory. The ePDGs are gateways to link Non-Trusted Non-3GPP networks to network operator EPCs and IMS services. The addresses of the ePDGs are publically known and therefore can be provided by the ISP 21 to the hubs 17 via a management service such as TR-069 or similar method for ISP 21 to hub 17 communication.

Alternatively the VoWiFi service monitor 27 provides a list of ePDGs it is monitoring during a registration process by the hub.

The VoWiFi monitor 39 identifies VoWiFi capable UEs 9 from the total set of connected WLAN devices by analyzing the IP Flows traversing the hub 17. In particular any IP Flows which have an ePDG gateway address as destination can be assumed to be an IP flow for VoWiFi traffic between a VoWiFi capable UE 9 and the MMTel voice service 15. If any such flows are present, the VoWiFi monitor 39 extracts the device information such as MAC address and saves a mapping between the UE 9 and the IP address of the ePDG of the subscriber MNO so that the hub 17 has a record of the subset of WLAN devices 9 which are VoWiFi capable and are using or have used the VoWiFi service to a known ePDG 25.

Monitoring IP flows relies on the standard processing of a UE 9 which is capable of VoWiFi service to establish the IPSec tunnel to the ePDG 25 as soon as it connects to the WLAN 19 in order to register and/or handover to VoWiFi from VoLTE. Therefore devices which do not establish a connection to an ePDG are considered to be standard WLAN devices.

A congestion monitor 47 is responsible for monitoring the throughput of any VoWiFi data flows between VoWiFi capable UEs and the ePDG. The throughput is compared against a threshold minimum level and if any of the flows are found to be below this level, then the VoWiFi service may be disrupted in future.

The scanning process is periodically performed by the VoWiFi monitor 39 to maintain the validity of the connected client list 45 so that any new devices 9 that connect to or disconnect from the WLAN 19 are identified. In this embodiment, the scan is performed every 5 minutes.

Furthermore, in accordance with this embodiment, the connection client list also contains entry fields for storing the status of the various ePDGs. The data is provided by the VoWiFi service monitor as will be described later.

The UE manager 43 is responsible for communicating with the VoWiFi capable UEs 9, details of which are stored in the connected client list, and especially to inform those UEs 9 when the ePDG is unavailable, when there may be congestion on the data link to the ePDG and also when the ePDG is available again after a service disruption.

Further details about the operation of the hub 17 and VoWiFi monitor function 39 will be described later once the other network components have been described.

Figure 4:
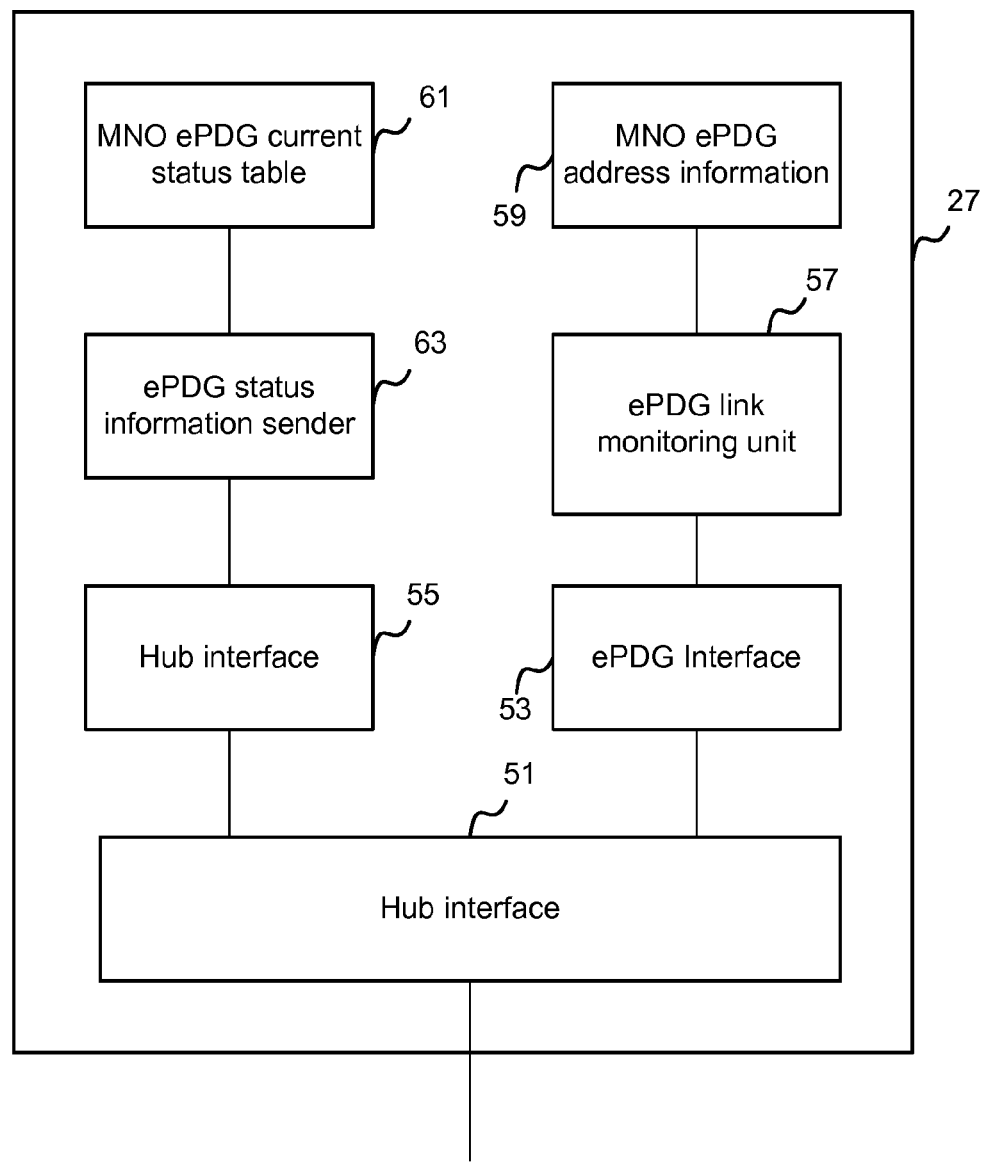
FIG. 4 schematically shows the components of a VoWiFi service monitor in the first embodiment.

FIG. 4 shows the functional components of the VoWiFi service monitor 27.

The VoWiFi service monitor 27 is configured as a server and contains a network interface 51 for external device communication. The network interface 51 can be divided into two main interfaces, an ePDG interface 53 for communication with the ePDGs 25 and a hub interface 55 for communication with the hubs 17.

An ePDG link monitoring unit 57 controls communication via the ePDG interface 53 which receives input from a MNO ePDG address information data store 59 which contains pre-stored IP address information for the location of each ePDG. In this embodiment, the status of the ePDG is determined by Pinging the address of the ePDG. If each set in the ping is successfully transmitted and acknowledged, then the logical data to the ePDG is deemed to be an indication that the ePDG is functioning correctly. If the pings are lost, then a problem is assumed to have occurred at the ePDG and therefore the ePDG is deemed to be inaccessible.

A MNO ePDG current status table holds the information relating to the results of the ePDG status scan.

An example of the contents of the MNO ePDG current status table is shown below. In the example all ePDGs for the set of MNOs are determined to be available.

TABLE 1

| MNO | ePDG Destination IP (via secure tunnel) | Logical Link state |
|-----|------------------------------------------|--------------------|
| 3a  | MNO 3a ePDG server IP                    | UP                 |
| 3b  | MNO 3b ePDG server IP                    | UP                 |
| 3c  | MNO 3c ePDG server IP                    | UP                 |

In this embodiment, the network availability of the ePDG associated with an MNO 3 is used as the indicator for whether the VoWiFi is/will be available to UEs 9. This is because the ePDG is the publicly addressable entry point to the MNO network. All VoWiFi traffic must travel via this network component between the MMTel service and any UEs 9 using VoWiFi. Therefore if access to the ePDG is disrupted then the VoWiFi service will not be available to any UEs 9.

The VoWiFi service monitor 27 is configured to monitor the logical network path between devices in the public network domain and the edge of the MNO network represented by the ePDG. Although the network paths will not be identical, if the VoWiFi network monitor 27 can establish contact with the ePDG, then other publically addressable devices such as the hub and UEs 9 should also be able to form a logical data path to the ePDG.

On the hub facing side of the VoWiFi service monitor 27, an ePDG status information sender is responsible for registering hubs subscribing to the monitoring service and using the data in the MNO ePDG current status table to notify registered hubs about ePDG status.

The processing performed by the VoWiFi service monitor 27 and the hub 17 are described in the Applicant's co-pending European applications EP15187793.3 and EP15203278.5 which are herein incorporated by reference to the present application.

Figure 5:
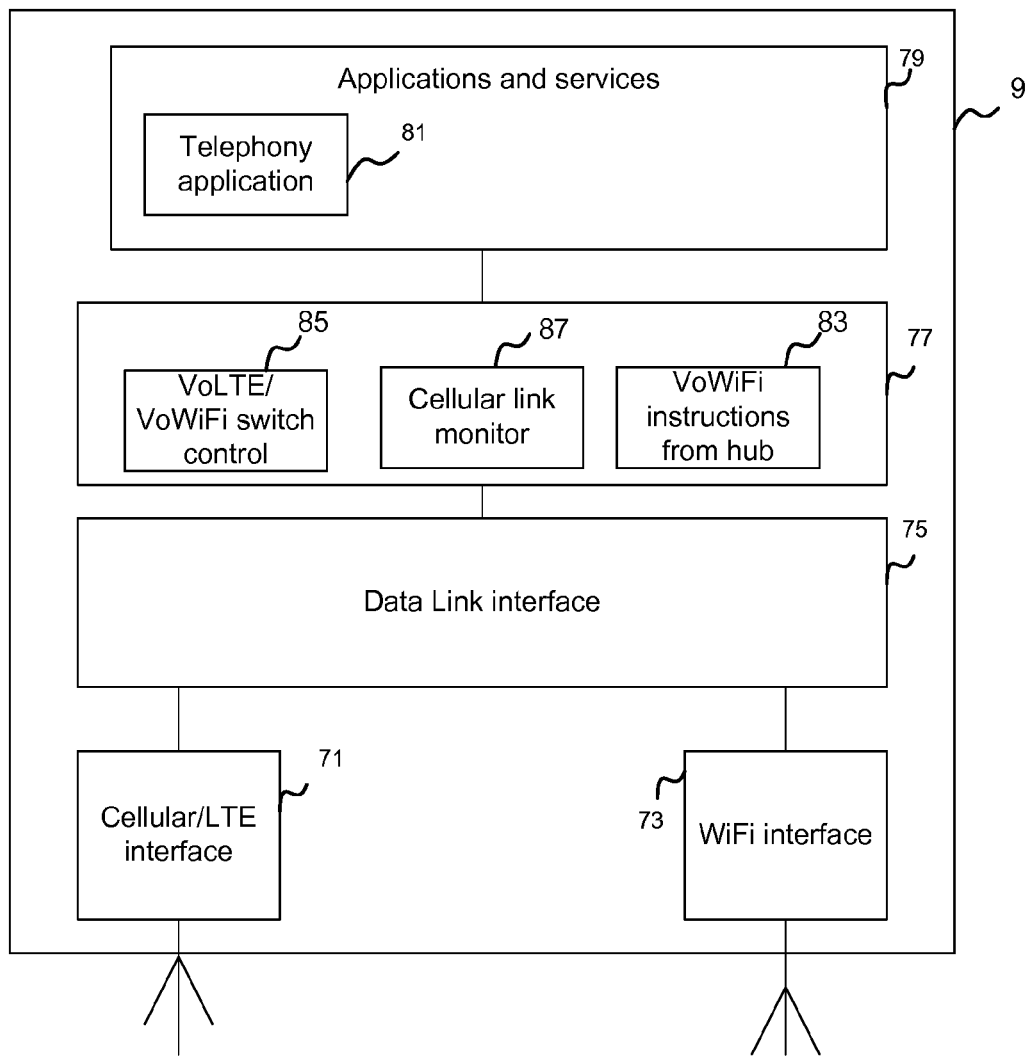
FIG. 5 schematically shows the internal components of a user entity device in accordance with the first embodiment.

The components of the UE 9 will now be described with reference to FIG. 5.

The UE 9 contains a cellular network interface 71 and a WLAN interface 73. The cellular interface 71 is compatible with the eNodeB 13 of the cellular network 3 and the WLAN interface 73 is compatible with the WLAN interface 31 of the hub 17.

Since either interface 71, 73, may be used by the UE 9, a data link interface 75 is responsible for enabling and disabling each interface 71, 73 as required and for routing user data and control packets to the interfaces 71, 73.

An operating system 77 is responsible for the overall operational tasks performed by the UE 9 and links a number of applications and services 79 to the data layer interface 75. One of the applications within the applications and services 79 is a telephony application 81 which is compatible with VoLTE and VoWiFi.

In normal operation, the telephony application 81 is configured to connect to the MMTel service 15 provided in the IMS 7 to provide voice services via VoLTE and VoWiFi. The UE 9 registers for VoWiFi when it is connected to a WLAN 19 and the UE 9 registers for VoLTE when it is connected to the LTE cellular network 3.

Within the operating system 77, the UE also has a receiver 83 for receiving instructions from the hub regarding VoWiFi connectivity, a VoLTE/VoWiFi switch control 85 for moving the telephony service from VoLTE from VoWiFi and from VoWiFi to VoLTE and a cellular link monitor 87 for monitoring the quality of the cellular link.

In the first embodiment, the hub 17 issues instructions to the UE 9 to drop the VoWiFi connection and register to VoLTE when the VoWiFi service monitor 27 determines that the ePDG is disrupted or when the hub determines that there is a problem with the link to the ePDG due to congestion.

In the first embodiment, the UE 9 may not immediately follow the instructions. Instead the VoLTE/VoWiFi switch control 85 controls the UE with regard to the cellular state and whether the ePDG 25 is disrupted or whether there is congestion.

Figure 6:
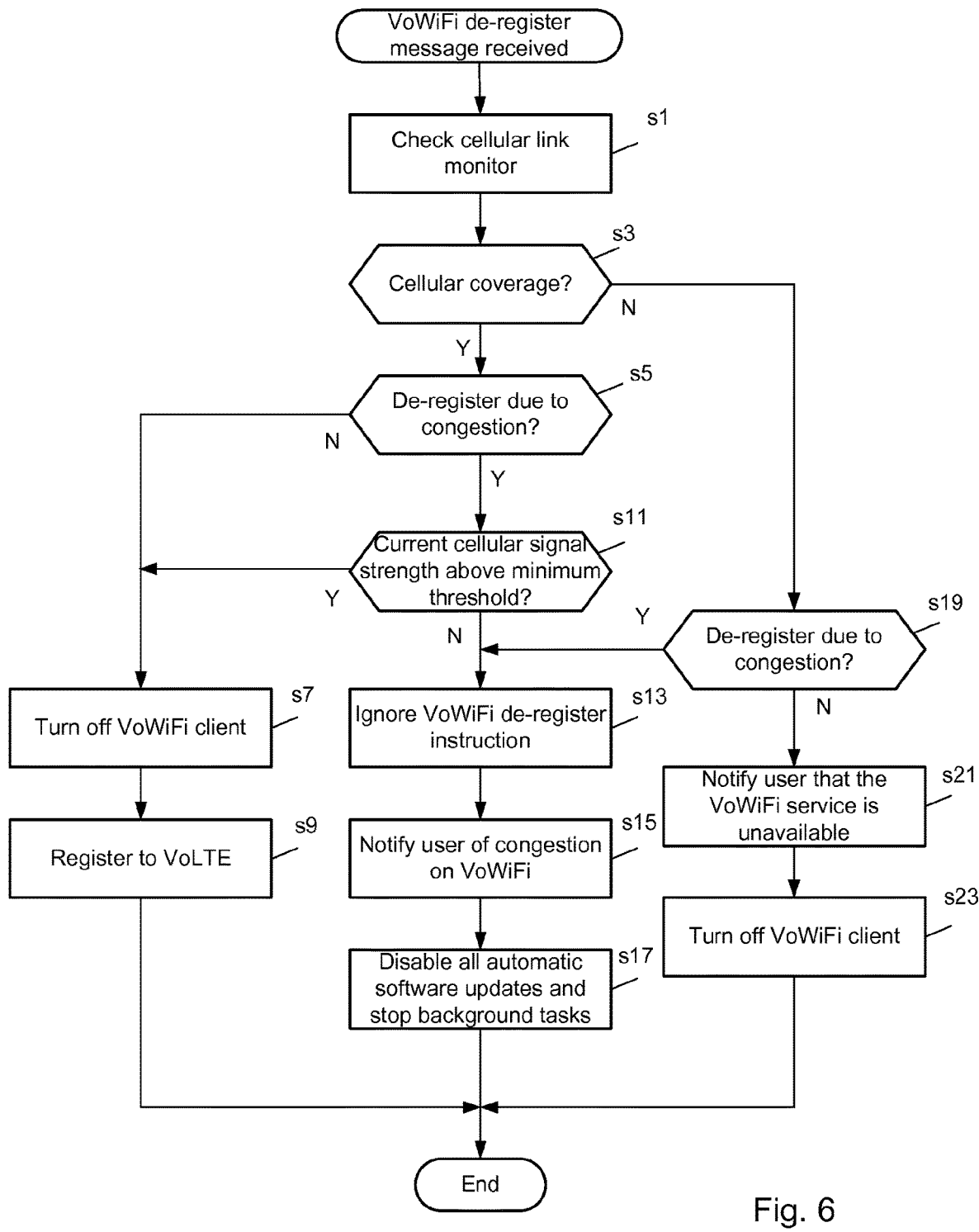
FIG. 6 is a flowchart showing the operation of the user entity device in response to an instruction to de-register from VoWiFi.

FIG. 6 is a flowchart showing the operation of the VoLTE/VoWiFi switch control 85 in response to a message from the hub 17 to de-register from VoWiFi.

In s1, the VoLTE/VoWiFi switch control 85 instructs the cellular link monitor 87 to temporarily test the connectivity to the UE's cellular network in terms of availability and signal strength measured in this embodiment as the Reference Signal Receive Power (RSRP) although other signal strength metrics can be used.

Having received the cellular link information, the VoLTE/VoWiFi switch control 85 considers four scenarios:
1) LTE available, ePDG unavailable and cellular signal available;
2) LTE available, ePDG available but congestion present;
3) LTE unavailable, ePDG available but congestion present; and
4) LTE unavailable, ePDG unavailable.

In s3 the VoLTE/VoWiFi switch control 85 checks whether the LTE link is available, if it is then in s5 VoLTE/VoWiFi switch control 85 analyses the de-registration notification from the hub 17 to determine whether the notification was issued due to congestion being present. If congestion was not present then scenario 1 is determined.

As a result of LTE being available but the ePDG being unavailable, in s7 the VoLTE/VoWiFi switch control 85 follows the received instruction from the hub to de-register from VoWiFi and in s9 the UE registers on VoLTE and then processing ends.

If during s5 it is determined that the notification is due to congestion, then in s11 the current cellular network signal strength is compared against a threshold which in this example is −120 dBm. If the signal strength to the cellular network is above the threshold, for example −95 dBm, the LTE signal is considered sufficiently strong to support VoLTE so processing moves to s7 explained above to turn off the VoWiFi client to enable a registration to VoLTE in s11 and then processing ends.

Alternatively, if in s11 the signal strength is below the threshold, for example −130 dBm, then the signal strength is deemed to be too low, so it is possible that a VoLTE session cannot be reliably maintained given the present location of the UE. Therefore processing moves to s13 where the VoLTE/VoWiFi switch control 85 decides it is better to remain on VoWiFi and tolerate the congestion by ignoring the de-registration notification from the hub 17.

In s15 the user is notified of the possible reduced service by way of a pop-up notification or status icon and to minimize disruption to the service, in s17 the VoLTE/VoWiFi switch control 85 requests the OS to disable any automatic software updates and stop any background tasks before processing ends.

The scenarios where a cellular connection is not available will now be described. In s3, if there is not cellular coverage, then in s19 the notification from the hub 17 is checked to determine whether the cause was congestion. If the notification did indicate congestion, then processing moves to previously described s13 to s17 to ignore the de-registration instruction and stay on VoWiFi given the absence of a VoLTE connection and then processing ends.

If in s19 the re-registration message indicates that there is no ePDG, then there is no ePDG or cellular connection and therefore there will be a temporary loss of service. In s21 the user is notified of the disruption and in s23 the VoWiFi client is turned off before processing ends.

With the above processing, the UE can more intelligently decide how to handle breaks in service to the VoWiFi service as notified by the hub. In particular, it can choose to ignore the instructions in dependence on the status of the cellular link to LTE and VoLTE. If it is likely that VoLTE will be impaired due to cellular reception issues, then the UE can choose to stay connected to VoWiFi.

The processing of FIG. 6 relates to how the UE handles VoWiFi when a de-registration instruction is received. However in this embodiment the UE 9 will maintain the WLAN connection so that other data services continue to travel via the WLAN interface and only the VoLTE service uses the LTE cellular connection.

Although there may be a battery penalty from enabling two wireless data connections simultaneously, the benefit is that only the VoLTE service is using LTE and therefore there is no disruption caused by a switch of network adaptor to other data services that may be active on the UE. Furthermore, most cellular subscribers to an MNO have data usage limits on the LTE service and therefore a transparent switch of all data services to LTE when the user believes they are on a WLAN (which is generally unmetered) would be a negative user experience.

Another benefit of maintaining the WLAN connection is that the hub will be able to send instructions to the UE that data connectivity to the ePDG has been restored or congestion has sub sided.

When the UE receives such an instruction, it will handover to VoWiFi and disable the LTE interface to save power.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of operating a mobile device having a cellular network interface for connection to a cellular network and a wireless local area network interface for connecting to a wireless local area network, the mobile device being connected to a voice service provided via a voice service gateway accessible via the wireless local area network interface, the method comprising:
   receiving a disconnection notification from a wireless access point connected to the mobile device via the wireless local area network interface to disconnect from the voice service via the wireless local area network interface;
   determining whether the disconnection notification is generated due to network congestion to the voice service gateway via the wireless local area network interface;
   if it is determined that the disconnection notification is due to network congestion,
      determining a signal quality to the cellular network via the cellular network interface;
      comparing the determined signal quality against a predetermined threshold; and
      if the signal quality to the cellular network is below the predetermined threshold, maintaining the connection to the voice service via the wireless local area network and the voice service gateway.

2. The method according to claim 1, further comprising:
   disabling background processes operating on the mobile device to minimize data bandwidth while the connection to the voice service via the wireless local area network is maintained.

3. The method according to claim 1, further comprising modifying a display of the mobile device to indicate to a user that the connection to the voice service via the wireless local area network interface has been maintained.

4. The method according to claim 1, wherein if the signal quality to the cellular network is above a predetermined threshold, disconnecting from the voice service via the wireless local area network connection and connecting to the voice service via the cellular network.

5. The method according to claim 4, wherein a set of non-voice data services operating on the mobile device continue to use the wireless local area network interface for communication with at least one remote server.

6. The method according to claim 4, further comprising:
   receiving a notification to reconnect to the voice service via the wireless local area network interface; and
   reconnecting to the voice service gateway via the wireless local area network interface.

7. An apparatus comprising:
   a cellular network interface for connection to a cellular network;
   a wireless local area network interface for connecting to a wireless local area network;
   at least one processor, the at least one processor to cause the apparatus to:
      connect to a voice service provided via a voice service gateway accessible via the wireless local area network interface;
   a receiver for receiving a disconnection notification from a wireless access point connected to the apparatus via the wireless local area network interface to disconnect from the voice service via the wireless local area network interface;
   the at least one processor further to cause the apparatus to:
      determine whether the disconnection notification is generated due to network congestion to the voice service gateway via the wireless local area network interface;
      determine a signal quality to the cellular network via the cellular network interface if it is determined that the disconnection notification is due to network congestion; and
      compare the determined signal quality against a predetermined threshold;
   wherein the at least one processor further causes the apparatus to maintain the connection to the voice service via the wireless local area network and the voice service gateway if the signal quality to the cellular network is below the predetermined threshold.

8. The apparatus according to claim 7, further comprising, the at least one processor further causes the apparatus to disable background processes operating on the apparatus to minimize data bandwidth while the connection to the voice service via the wireless local area network is maintained.

9. The apparatus according to claim 7, further comprising a display operable to indicate to a user that the connection to the voice service via the wireless local area network interface has been maintained.

10. The apparatus according to claim 7, wherein if the signal quality to the cellular network is above a predetermined threshold, the at least one processor further causes the apparatus to disconnect from the voice service via the wireless local area network connection and connect to the voice service via the cellular network.

11. The apparatus according to claim 10, further comprising a set of non-voice data services and a network controller operable to cause the set of non-voice data services to continue to use the wireless local area network interface for communication with at least one remote server.

12. The apparatus according to claim 10, wherein the receiver is operable to receive a notification to reconnect to the voice service via the wireless local area network interface; and
   the at least one processor further causes the apparatus to reconnect to the voice service gateway via the wireless local area network interface.

13. A non-transitory computer-readable storage medium storing processor executable instructions operable to cause a programmable processor to carry out the method according to claim 1.

* * * * *